US012031030B2

(12) United States Patent
Geyer et al.

(10) Patent No.: US 12,031,030 B2
(45) Date of Patent: Jul. 9, 2024

(54) PROCESS FOR PREPARING A SULFUR COPOLYMER

(71) Applicant: BASF SE, Ludwigshafen am Rhein (DE)

(72) Inventors: Florian Ludwig Geyer, Ludwigshafen (DE); Peter Rudolf, Ludwigshafen (DE)

(73) Assignee: BASF SE, Ludwigshafen Am Rhein (DE)

( * ) Notice: Subject to any disclaimer, the term of this patent is extended or adjusted under 35 U.S.C. 154(b) by 0 days.

(21) Appl. No.: 18/552,651

(22) PCT Filed: Mar. 21, 2022

(86) PCT No.: PCT/EP2022/057269
§ 371 (c)(1),
(2) Date: Sep. 26, 2023

(87) PCT Pub. No.: WO2022/207376
PCT Pub. Date: Oct. 6, 2022

(65) Prior Publication Data
US 2024/0101823 A1    Mar. 28, 2024

(30) Foreign Application Priority Data

Mar. 28, 2021 (EP) .................... 21165425

(51) Int. Cl.
*C08L 81/04*  (2006.01)
*C08G 75/28*  (2006.01)

(52) U.S. Cl.
CPC ............ *C08L 81/04* (2013.01); *C08G 75/28* (2013.01)

(58) Field of Classification Search
CPC ................. C08L 81/04; C08G 75/28
See application file for complete search history.

(56) References Cited

U.S. PATENT DOCUMENTS

| | | | |
|---|---|---|---|
| 3,232,936 | A | 2/1966 | Reynolds |
| 5,929,202 | A | 7/1999 | Arita et al. |
| 2014/0199592 | A1 | 7/2014 | Pyun et al. |

FOREIGN PATENT DOCUMENTS

| | | |
|---|---|---|
| EP | 0 943 660 | 9/1999 |
| EP | 1 431 329 | 6/2004 |
| WO | 2019/034470 | 2/2019 |
| WO | 2019/034473 | 2/2019 |
| WO | 2020/229393 | 11/2020 |

OTHER PUBLICATIONS

Soga et al. (Die Mukromolrkulure Chemie 176, 807-811 (1975).*
Griebel et al. (Progress in Polymer Science 58 (2016) 90-125).*
International Search Report dated Apr. 19, 2022, in PCT/EP2022/057269, 4 pages.
Sanda et al., "The first anionic Ring-Opening Polymerization of Cyclic Monothiocarbonate via Selective Ring-Opening with C—S Bond Cleavage", Macromolecules, vol. 32, No. 17, 1999, pp. 5715-5717.
Written Opinion dated Apr. 19, 2022, in PCT/EP2022/057269, 5 pages.
Duda, et al., "Anionic copolymerization of elemental sulfur with propylene sulfide", Macromolecules, vol. 15, Issue 1, Jan. 1, 1982, pp. 36-40.
Duda, et al., "Liquid oligomeric diols with high sulfur content from elemental sulfur, cyclic sulfides and dihydroxypolysulfides", Die Makromolekulare Chemie, Rapid Communications, vol. 9, Issue 3, Mar. 1988, pp. 151-157.
European Search Report for EP Patent Application No. 21165425.6, dated Oct. 12, 2021, 4 pages.
Glenn Carroll, "Polysulfides—Natures Organic Soluble Sulfur", Phosphorus, Sulfur, and Silicon and the Related Elements, vol. 95, Issues 1-4, 1994, pp. 517-518.
Griebel, et al., "Polymerizations with elemental sulfur: A novel route to high sulfur content polymers for sustainability, energy and defense", Progress in Polymer Science, vol. 58, Jul. 2016, pp. 90-125.
Schmidt, et al., "Copolymerization of Tetrameric Thioformaldehyde with Oligomeric Thioformaldehydes, Substituted Analogs, or Sulfur", Angewandte Chemie International Edition in English, vol. 17, Issue 1, Jan. 1978, pp. 51-52.
International Preliminary Report on Patentability for PCT/EP2022/057269, dated Oct. 12, 2023, 7 pages.

* cited by examiner

*Primary Examiner* — Shane Fang
(74) *Attorney, Agent, or Firm* — Grüneberg and Myers PLLC

(57) ABSTRACT

A process for preparing a sulfur copolymer, a sulfur copolymer, and a polymer composition containing one or more sulfur copolymers are provided. The process involves copolymerizing a cyclic monothiocarbonate compound of formula (I)

$$\underset{R^2 \quad R^1,}{\overset{O}{\underset{O\diagdown S}{\bigtriangleup}}}$$

wherein $R^1$ and $R^2$ are independently of one another hydrogen, $C_1$-$C_{18}$-alkyl, $C_1$-$C_{18}$-alkyl substituted with halogen or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio or halogen; with elemental sulfur in the presence of a polymerization initiator.

19 Claims, No Drawings

PROCESS FOR PREPARING A SULFUR COPOLYMER

CROSS-REFERENCE TO RELATED APPLICATIONS

This application is the National Stage entry under § 371 of International Application No. PCT/EP2022/057269, filed on Mar. 21, 2022, and which claims the benefit of priority to European Patent Application No. 21165425.6, filed on Mar. 28, 2021 The content of each of these applications is hereby incorporated by reference in its entirety.

The present invention relates to a process for preparing a sulfur copolymer by copolymerizing a 5-membered cyclic monothiocarbonate compound with elemental sulfur in the presence of a polymerization initiator, a sulfur copolymer obtainable by said process, and a composition comprising one or more sulfur copolymers.

BACKGROUND OF THE INVENTION

Sulfur plays a crucial role in many applications within the chemical industry.

Vulcanization of rubber was made possible through its use as a cross-linking agent. A polymeric form of sulfur is used as a vulcanization agent for rubber under the tradename Crystex (Eastman).

As organic polysulfides are an excellent vehicle for transporting sulfur to the reaction site, they have become the sulfur source of choice. G. Carroll, Phosphorus, Sulfur and Silicon, 1994, 95-96, 517-518, describes various applications of polysulfides.

For example, in the lubrication industry polysulfides are used to prevent metal surfaces from welding during extreme load-carrying conditions by forming a protective layer thereon. The advantage of the use as an extreme-pressure agent is that they do not comprise olefinics, chlorine or color producing trithiones.

Dimethyldisulfide may be used as a presulfiding agent to increase the lifetime of metal oxide-based catalysts in the petroleum industry. Dimethyldisulfide may also be used as sulfur solvent in the oil and gas industry.

J. J. Griebel et al., Progr. Polym. Sci., 58, 2016, 90-125, describe sulfur-containing polymeric materials derived from $S_8$, thus having a high degree of sulfur catenation, i.e., high S—S bond rank within the polymer structure. Polysulfides, a class of high sulfur content polymers, are structurally similar to polymeric sulfur, but with improved stability and processing capabilities. The synthesis of polysulfides directly from elemental sulfur may be carried out by condensation, free-radical and ionic copolymerization reactions.

Polysulfide rubbers are polycondensation products of organic dihalogenides and alkali polysulfides, known, for example, under the tradename Thiokol and used as elastomer for sealants. They may be liquid polymers and are optionally cross-linked by oxidizing the polymer's terminal SH groups to disulfide links.

Anionic copolymerization of propylene sulfide with elemental sulfur, initiated with sodium thiophenoxide, is described, for example, by A. Duda et al., Macromolecules, 1982, 15, 36-40. A copolymer with a sulfur content of up to 85 wt %, i.e., with an average z in —[$CH_2CH(CH_3)S_z$]— up to 8, is described.

A. Duda et al., Macromol. Chem., Rapid Commun., 1988, 9, 151-157, describe an anionic co-oligomerization of $S_8$ with cyclic sulfides in the presence of symmetric bis(hydroxyalkyl)polysulfides leading to liquid α,ω-oligodiols with a number average $M_n$ of 700-2500 g/mol and containing up to 80 wt % of chemically linked sulfur.

Cationic bulk copolymerization is known from M. Schmidt et al., Angew. Chem. Int. Ed., 1978, 17, 51-52, by ring opening of cyclic sulfur-containing comonomers with a Lewis acid to yield linear polysulfides.

The use of $S_8$ as a reaction medium and comonomer in a process termed inverse vulcanization is also described by J. J. Griebel et al., Progr. Polym. Sci., 58, 2016, 90-125, for example, using 1,3-diisopropenylbenzene in the bulk copolymerization with $S_8$ to provide statistical copolymers poly (sulfur-random-(1,3-diisopropenylbenzene)).

US 2014/0199592 A1 discloses polymeric compositions comprising a copolymer of sulfur and one or more monomers like diisopropenyl-benzene or propylene sulfide. For example, the preparation of a sulfur/propylene sulfide copolymer with benzyl dithiobenzoate as an initiator, tetraphenylphosphonium chloride in toluene using thioacyl group transfer polymerization and leading to a pale red oil polymer is described.

U.S. Pat. No. 5,929,202 A discloses a process for preparing ethylene sulfide/sulfur copolymers by polymerizing ethylene sulfide with sulfur in the presence of a polymerization initiator, for example, an aliphatic tertiary amine like DABCO (1,4-diazabicyclo[2.2.2]octane) or tetrabutylammonium acetate and a solvent. The copolymers are described to be useful as a vulcanizer and a vulcanization accelerator in tire quality rubber or as an industrial elastomer. However, the use of ethylene sulfide or propylene sulfide is to be avoided with respect to low storage stability.

The incorporation of a high content of S—S bonds into polymers offers a route to materials having suitable properties, since such moieties are redox-active, highly polarizable, impart a high refractive index and exhibit dynamic covalent character. Thus, organic polysulfides play an important role in various industries.

Many preparation processes to access organic polysulfides show shortcomings. For example, halogenated precursors pose the risk of halogen contamination in the product. The use of olefins offers the risk of residual olefin in the product. In case of episulfide-derived polysulfides the synthesis is based on high energy starting materials which are not generally available.

Thus, there is still a need for an easily available synthetic route to organic sulfur polymers which enables an industrially viable production.

Further, there is a need for easily available copolymers having a desirable and adjustable sulfur content suitable for use in optical applications, in sealant applications, in sulfur immobilization in polymer matrices, as a metal working fluid and/or as an active material in Li—S batteries.

Therefore, it is an object of the present invention to provide a process for preparing a sulfur copolymer, which is economic and flexible.

Further, it is an object of the present invention to provide a process for preparing a sulfur copolymer using a S-containing monomer which has improved storage stability, compared to ethylene sulfide or propylene sulfide.

Further, it is an object of the present invention to provide a sulfur copolymer which has a high refractive index, suitable for use, for example, in an optical application.

Further, it is an object of the present invention to provide a sulfur copolymer which has a high content of sulfur and/or high viscosity, for example, suitable for use as a metal working fluid.

SUMMARY OF THE INVENTION

It has now been found that a sulfur copolymer may be easily prepared by reacting a cyclic monothiocarbonate compound with elemental sulfur in the presence of a polymerization initiator. Especially, the process for preparing a sulfur copolymer provides an easy access for copolymers having a desirable sulfur content, which may be adjusted and thus being suitable for use in optical applications, in sealant applications, in sulfur immobilization in polymer matrices, as a metal working fluid and/or as an active material in Li—S batteries.

Accordingly, in a first aspect the invention relates to a process for preparing a sulfur copolymer, the process comprising a step of polymerizing a cyclic monothiocarbonate compound of formula

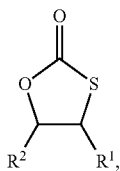

(I)

wherein
$R^1$ and $R^2$ are independently of one another hydrogen, $C_1$-$C_{18}$-alkyl, $C_1$-$C_{18}$-alkyl substituted with halogen or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio or halogen; with elemental sulfur in the presence of at least one polymerization initiator.

In a further aspect, the invention relates to a sulfur copolymer, obtainable by a process, as defined in any aspect herein.

In a further aspect, the invention relates to a sulfur copolymer comprising n alkylene units of formula

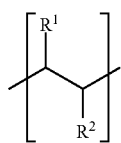

(II)

and (n+1) polysulfide units, wherein the polysulfide units in total comprise (2n+1) to (2n+9) sulfur atoms,
$n \geq 1$, and
$R^1$ and $R^2$ are as defined in any aspect herein.

In a further aspect, the invention relates to a polymer composition comprising one or more sulfur copolymers, as defined in any aspect herein.

DETAILED DESCRIPTION OF THE INVENTION

The terms alkyl, alkoxy, alkylthio, aryl, halogen are known in the art and generally have the following meaning, if said groups are not further specified in specific embodiments mentioned below:

Alkyl, e.g., $C_1$-$C_{18}$-alkyl, $C_1$-$C_3$-alkyl or $C_1$-$C_4$-alkyl, may be within the given limits of carbon atoms linear or branched, where possible. Examples are methyl (Me), ethyl (Et), n-propyl, isopropyl, n-butyl, 1-methylpropyl, 2-methylpropyl, t-butyl, n-pentyl, 2-pentyl, 3-pentyl, 2,2-dimethylpropyl, n-hexyl, 1-methylhexyl, n-heptyl, 1,1,3,3-tetramethylbutyl, 1-methylheptyl, 3-methylheptyl, n-octyl, 2-ethylhexyl, n-nonyl, n-decyl, n-undecyl, n-dodecyl, n-tridecyl, n-tetradecyl, n-pentadecyl, n-hexadecyl, n-heptadecyl, n-octadecyl and constitutional isomers of the aforementioned n-alkyl radicals.

Any alkyl group of more than one, especially more than 2 carbon atoms, or such alkyl moieties which are part of another moiety may be interrupted by a heterofunction like —O— or —S—. They may be interrupted with one or more of these heterofunction groups, one group in each case being inserted, in general, into one C—C-bond of the alkyl group. If the interrupted group is additionally substituted, the substituents are generally not at the heteroatom. If two or more interrupting groups of the type —O— or —S— occur in one radical, they generally are identical.

Alkoxy, e.g., $C_1$-$C_4$-alkoxy, is alkyl-O.
Alkylthio, e.g., $C_1$-$C_4$-alkylthio, is alkyl-S.
Aryl, e.g., $C_6$-$C_{13}$-aryl, or $C_6$-$C_{12}$-aryl, may be within the given limits of carbon atoms phenyl, fluorenyl, biphenylyl, terphenylyl or naphthyl, which may have a fused ring, such as in indanyl. Preferred examples are phenyl, 1-naphthyl, 2-naphthyl, 3- or 4-biphenylyl. Each aryl may be unsubstituted or substituted one or more times.

Halogen (Hal) denotes I, Br, Cl, or F, preferably Cl on alkyl and Cl or Br on aryl.

The substituent "$C_{12/14}$" means a substituent derived from $C_{12}$/$C_{14}$ fatty alcohol.

The term "substituted" means "substituted one or more times with", that is 1 to 3 times, where possible, preferably 1 or 2 times, more preferably 1. If a substituent occurs more than once in a group, it may be different in each occurrence.

The term "sulfur copolymer", as used herein, include oligomers and polymers, i.e., having at least two polysulfide units and at least one alkylene unit, provided that at least one S—S-bond is present. Usually, the terminal units of formula

(IVa)

or of formula

(IVb)

are not comprised in the definition of the sulfur copolymer.

The term "polysulfide unit", as used herein, includes a thioether group and a polysulfide group of at least 2 sulfur atoms ($S_2$).

As used herein, the singular forms of the articles "a", "an" and "the" include plural forms unless the content clearly dictates otherwise.

Typically, the instant process provides a mixture of one or more sulfur copolymers.

Accordingly, in a further aspect the invention relates to a process for preparing a polymer composition comprising one or more sulfur copolymers, the process comprising a step of polymerizing a cyclic monothiocarbonate compound of formula

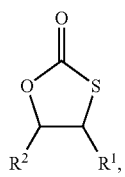

(I)

wherein

R¹ and R² are independently of one another hydrogen, $C_1$-$C_{18}$-alkyl, $C_1$-$C_{18}$-alkyl substituted with halogen or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio or halogen;

with elemental sulfur in the presence of at least one polymerization initiator.

In a preferred aspect the invention relates to a process for preparing a sulfur copolymer, wherein R¹ and R² are independently of one another hydrogen, $C_1$-$C_4$-alkyl, $C_1$-$C_{18}$-alkyl substituted with halogen or interrupted with O or S; $C_6$-$C_{12}$-aryl or $C_6$-$C_{12}$-aryl substituted with $C_1$-$C_4$-alkyl, $C_1$-$C_4$-alkoxy, $C_1$-$C_4$-alkylthio or halogen.

More preferred is a process for preparing a sulfur copolymer, wherein the cyclic monothiocarbonate compound of formula (I) is a cyclic monothiocarbonate compound of formula

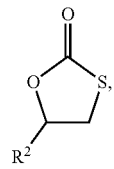

(V)

wherein

R² is hydrogen, $C_1$-$C_4$-alkyl, $C_1$-$C_3$-alkyl substituted with halogen or interrupted with O or S; or phenyl.

Accordingly, in a more preferred aspect, the invention relates to a process for preparing a sulfur copolymer, wherein R¹ is hydrogen, and R² is hydrogen, $C_1$-$C_4$-alkyl, $C_1$-$C_3$-alkyl substituted with halogen or interrupted with O or S; or phenyl.

A cyclic monothiocarbonate compound of formula (V) to be reacted in the instant process is preferred, wherein R² is hydrogen or $C_1$-$C_4$-alkyl or $C_1$-$C_3$-alkyl substituted with halogen or interrupted with O.

More preferred is a cyclic monothiocarbonate compound of formula (V) to be reacted in the instant process, wherein R² is hydrogen, $C_1$-$C_4$-alkyl or $C_1$-$C_6$-alkyl interrupted with O.

Especially preferred is a process for preparing a sulfur copolymer, wherein R¹ is hydrogen, and R² is hydrogen or $C_1$-$C_4$-alkyl.

In particular preferred is a process for preparing a sulfur copolymer, wherein R¹ is hydrogen, and R² is $C_1$-$C_4$-alkyl.

Suitable examples of a cyclic monothiocarbonate compound of formula (V) include cyclic monothiocarbonates of formulae

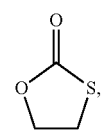

(Va)

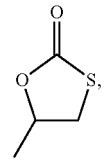

(Vb)

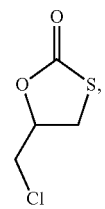

(Vc)

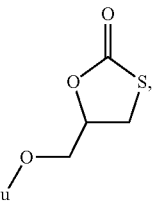

(Vd)

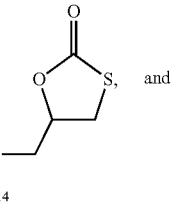

(Ve) and

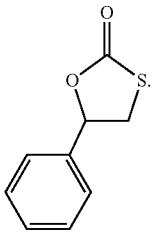

(Vf)

One or more compounds of formula (I), preferably one or more compounds of formula (V), may be used in the process of the invention.

The process is preferred, wherein one compound of formula (I), preferably one compound of formula (V) is employed.

Particular preferred is a process, wherein a compound of formula (Vb) is used.

Also preferred is a process, wherein a mixture of two different compounds of formula (I) is used. More preferred is a process, wherein a mixture of two different compounds is used, wherein the mixture comprises a compound of formula (Va) or a compound of formula (Vb).

Further preferred is a process, wherein a mixture of a compound of formula (Va) and a compound of formula (Vb) is used. More preferred is a process, wherein a compound of formula (Vb) is used in an amount of more than 50 wt %, based on the total weight of the mixture of a compound of formula (Va) and a compound of formula (Vb). A cyclic monothiocarbonate compound of formula (I) or of formula (V) may be prepared in accordance with processes described in U.S. Pat. Nos. 3,072,676, 3,201,416 or WO 2019/034469 A1.

Generally, cyclic monothiocarbonate compounds of formula (I) are liquid at 21° C., 1 bar. In case a cyclic monothiocarbonate compound of formula (I) is solid at 21° C., 1 bar, said compound may be applied in stable molten form at the temperature of polymerization.

Suitable sulfur sources may be sulfur recovered from hydrogen sulfide as a raw material emanating from the process of petroleum refining or sulfur occurring in nature. Suitable sulfur may be sublimed sulfur, precipitated sulfur, flower of sulfur and colloidal sulfur.

Elemental sulfur may be provided in powdered form. Under ambient conditions elemental sulfur primary exists in an eight-membered ring form ($S_8$) which melts at temperatures in the range of 120-124° C. and undergoes an equilibrium ring-opening polymerization of the $S_8$ monomer into a linear polysulfane with diradical chain ends, above 159° C.

$S_8$, as most stable and cheapest feedstock, is usually used in the instant process. However, many other allotropes of sulfur may be used, such as other cyclic allotropes derivable by melt-thermal processing of $S_8$. Any sulfur species that results in a diradical or anionic polymerizing species, when heated, may be used in the instant process.

Generally, the process for preparing the sulfur copolymer is carried out by copolymerizing a cyclic monothiocarbonate compound of formula (I) and elemental sulfur in the presence of a polymerization initiator.

Essentially any type of polymerization initiator may be used to initiate the reaction, usually one which may be used for anionic, cationic or coordination polymerization. Preferably, an anionic polymerization initiator is used.

Examples of an anionic polymerization initiator include an amine-containing base, an organic phosphine compound, a metal salt of a mercapto compound, a metal alcoholate, and a basic inorganic compound, preferably a basic inorganic salt.

Examples of an amine-containing base include a compound with a tertiary amino group, a guanidino group or an amidine group.

Examples of a compound with a tertiary amino group include trimethylamine, triethyl-amine, tributylamines, 2,4,6-tris(dimethylaminomethyl)phenol, pyridine, 1,4-diazabicyclo[2.2.2]octane (DABCO), tetramethylethylenediamine and dimethylamino-pyridine (DMAP).

Examples of a compound with a guanidine group include guanidine (1,5,7-triaza-bicyclodocene (TBD)).

Examples of a compound with an amidine group include diazabicyclo[5.4.0]undec-7-ene (DBU), 1,5-diazabicyclo[4.3.0]non-5-ene (DBN) and N-methyl-1,5,7-triazabicyclododecene (MTBD).

Examples of an organic phosphine compound include triphenylphosphine or tributylphosphine.

Examples of a metal alcoholate include sodium methoxide.

Examples of a metal salt of a mercapto compound include sodium thiomethoxide, sodium thiophenoxide or the sodium salt of 2-mercaptobenzothiazole.

An organic thiol compound may be added as a starter in the copolymerization reaction, for example, a mono-, di- or polymercaptan. The thiol compound is usually added together with an organic base, for example, with a compound with an amine group or an amidine group, like DBU, DBN or MTBD. The thiol compounds may be introduced to be retained as a covalently bound part of the copolymer.

Examples of a suitable mono-thiol compound are a $C_1$-$C_{12}$-alkyl mercaptan and an aryl mercaptan like thiophenol.

Examples of a suitable dithiol compound include 1,2-dimercaptoethane, 2,2-dimercaptopropane, 1,3-dimercaptopropane, 1,4-dimercaptobutane, 1,6-dimercapto-hexane, tetra(ethylene glycol)dithiol, 3,6-dioxa-1,8-octane-dithiol, 2,2'-thiodiethanethiol, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,3,3-tetrakis(mercaptomethylthio)propane, 1,2-bis(2-mercaptoethyl-thio)ethane, 1,5-dimercapto-3-oxapentane, 2,2-dimethylpropane-1,3-dithiol, 2-mercaptomethyl-1,3-dimercaptopropane, benzenedimethanethiol (isomers), (1,1'-bihenyl)-4,4'-dimethanethiol, 2-mercaptoethyl-ether, dimercaptobenzene (isomers), terphenyldithiol, 1,4-bis(mercaptomethyl)cyclohexane, 1,4-dimercaptocyclohexane, bis(4-mercaptophenyl)sulfide, bis(4-mercaptophenyl)ether, 2-mercaptomethyl-1,4-dimercaptopropane, 2-(2-mercaptoethylthio)-1,3-dimercaptopropane, 1,2-bis(2-mercaptoethylthio)-3-mercaptopropane, ethyleneglycol-dithioglycolate, ethyleneglycol-bis(2-mercapto-acetate), ethyleneglycol-bis(3-mercaptopropionate), 1,4-butanediol-bis(2-mercapto-acetate), 1,4-butanediol-bis(3-mercaptopropionate), 2,5-bis(mercapto-methyl)-1,4-dithiane, 2,5-bis(mercaptoethyl)-1,4-dithiane, 2,2-bis(4-mercaptophenyl)-propane, bis(4-mercaptomethylphenyl)sulfide, bis(4-mercaptomethylphenyl)ether and 2,2-bis(4-mercaptomethylphenyl) propane.

Examples of a suitable trithiol compound include 1,3,5-trimercaptobenzene, 1,3,5-tris(mercaptomethyl)benzene, trimethylolpropane-tri(3-mercaptopropionate), trimethylolpropane-tris(thioglycolate), 1,2,3-trimercaptopropane, trimethylolpropane-tris(2-mercaptoacetate), trimethylolpropane-tris(3-mercaptopropionate) and 1,1,1-tris(mercaptomethyl)propane.

Examples of a suitable tetrathiol compound include pentaerythritol-tetrakis(thioglycolate), pentaerythritol-tetrakis(2-mercaptoacetate), pentaerythritol-tetrakis(3-mercaptopropionate), 1,1,3,3-tetrakis(mercaptomethylthio)propane and tetrakis(mercaptomethyl)methane.

The organic thiol compound may be added to the copolymerization reaction in an amount up to 10 wt %, based on the total weight of elemental sulfur and cyclic monothiocarbonate compound of formula (I), preferably up to 5 wt %.

Examples of a basic inorganic compound are basic zeolites, metal oxides, metal hydroxides, metal sulfides including ammonium sulfide, hydrotalcite and basic clays.

Preferably, the basic inorganic compound is an inorganic salt selected from a metal hydroxide, a metal sulfide, ammonium sulfide, a metal hydrogen sulfide, a metal oxide, a metal phosphate or a metal silicate. The term "sulfide" includes mono-, oligo- and polysulfides of formula $(S_p)^{2-}$ with p being an integer of at least 1 to 10. The term "hydrogensulfide" includes mono-, oligo- and polyhydrogensulfides of formula $(HS_q)^{1-}$ with q being an integer of at least 1 to 10.

More preferably, the basic inorganic compound is an inorganic salt selected from a metal hydroxide, a metal sulfide, ammonium sulfide or a metal hydrogen sulfide. The cation of the inorganic salt is preferably a cation with one or two positive charges, as, for example, an alkali or earth alkali cation, more preferably an alkali cation such as sodium or potassium.

Examples of an especially preferred inorganic salt is NaOH, KOH, NaSH, $(NH_4)_2S_p$, $Na_2S_p$ and $K_2S_p$ with p being 1 to 10.

Examples of a cationic polymerization initiator include, for example, a Lewis acid such as titanium tetrachloride, aluminum chloride or a boron trifluoride diethylether complex.

Examples of a coordination polymerization initiator include a metal compound such as diethyl zinc, zinc acetate, triethylaluminium, zinc dimethyldithiocarbamate and zinc diethyldithiocarbamate.

Preferably, the polymerization initiator is an anionic polymerization initiator selected from the group consisting of an amine-containing base, an organic phosphine compound, a metal salt of a mercapto compound and a basic inorganic salt.

Accordingly, in a preferred aspect, the invention relates to a process for preparing a sulfur copolymer, wherein the polymerization initiator is an anionic polymerization initiator selected from the group consisting of an amine-containing base, an organic phosphine compound, a metal salt of a mercapto compound and a basic inorganic salt.

More preferably, the polymerization initiator is an anionic polymerization initiator selected from the group consisting of an amine-containing base, an organic phosphine compound and a basic inorganic salt, more preferably a basic inorganic salt.

Examples of an amine-containing base are preferably a compound with a tertiary amino group, a guanidino group or an amidine group.

Thus, most preferably, the anionic polymerization initiator is an anionic polymerization initiator selected from the group consisting of an amine-containing base, selected from a compound with a tertiary amino group, a guanidino group or an amidine group, an organic phosphine compound and a basic inorganic salt, wherein the basic inorganic salt is selected from NaOH, KOH, NaSH, $(NH_4)_2S_p$, $Na_2S_p$ or $K_2S_p$ with p being 1 to 10.

Accordingly, in a preferred aspect, the invention relates to a process for preparing a sulfur copolymer, wherein the polymerization initiator is an anionic polymerization initiator, selected from the group consisting of an amine-containing base, an organic phosphine compound and a basic inorganic salt, preferably a basic inorganic salt.

In a further preferred aspect, the invention relates to a process for preparing a sulfur copolymer, wherein the anionic polymerization initiator is a basic inorganic salt.

Especially preferred is a polymerization initiator which is a basic inorganic salt, selected from NaOH, KOH, NaSH, $Na_2S_p$, $(NH_4)_2S_p$ or $K_2S_p$ with p being 1 to 10.

The polymerization initiator may be used in a catalytically effective amount, for example, in an amount of from 0.01 to 0.5 mol, based on 1 mol of elemental sulfur $S_8$, preferably 0.02 to 0.3 mol.

If desired, a viscosity modifier may be added within the instant process. Such viscosity modifiers are known in the art. Preferably, no viscosity modifier is added.

The process is usually conducted under inert atmosphere and at an elevated temperature, for example, at a temperature of from 40 to 230° C. (copolymerization temperature). The copolymerization reaction may be carried out in a solvent or without a solvent.

Accordingly, in a preferred aspect, the invention relates to a process for preparing a sulfur copolymer, wherein the step of copolymerizing is conducted at a temperature in the range of from 40 to 230° C.

In case a solvent is used, the step of copolymerization is usually conducted at a temperature in the range of from 40 to 180° C., preferably from 60 to 160° C.

In case no solvent is used, the step of copolymerization is usually conducted at a temperature in a range of from about 120° C. to about 230° C.

The reaction time of the copolymerizing step may vary in the range of from 0.5 to 8 hours, preferably from 1 to 6 hours.

Accordingly, preferred is a process, wherein the step of copolymerizing is conducted in the presence of an anionic polymerization initiator for 0.5 to 8 hours and at an elevated temperature, wherein the temperature is in the range of from 40 to 180° C., especially 60 to 160° C., when the process is performed with a solvent, or wherein the temperature is in the range of from 120 to 230° C., when no solvent is used.

If present, the solvent may be an organic solvent.

Examples of a suitable organic solvent are a ketone like acetone, butanone, cyclohexanone or methyl isobutyl ketone; an aromatic solvent like benzene, toluene or xylenes; an ether like tetrahydrofuran (THF), dioxane, dioxolane or dimethylethylene glycol; an ester like ethyl acetate or butyl acetate; an amide like dimethyl formamide (DMF) or N-methyl-pyrrolidone (NMP); an aliphatic hydrocarbon like hexane or cyclohexane; a halogen-containing solvent like chloroform; an alcohol like ethanol, isopropanol, glycol ethers or propyleneglycol monomethylether; and carbon disulfide. Preferred of them are ketones, ethers and carbon disulfide. The solvents may be used individually or as a combination of two or more thereof.

A solvent may be used in an amount such that the raw materials elemental sulfur, polymerization initiator and cyclic monothiocarbonate compound of formula (I) form a mixture of 20 to 60 wt % of solids, based on the total weight of solvent and raw materials.

The order of charging the raw materials comprising elemental sulfur, the monothiocarbonate compound of formula (I), the polymerization initiator and optionally the solvent and the organic thiol compound to the reactor may be varied in order to affect the desired structure of the sulfur copolymer.

The mixture comprising the raw materials at the beginning of the reaction at room temperature may be a suspension, solution or a solid mixture, dependent on the kind of raw materials.

For example, elemental sulfur and the cyclic monothiocarbonate compound of formula (I) may be added to the polymerization initiator simultaneously or alternately at the copolymerization temperature.

Alternatively, a part of elemental sulfur or cyclic monothiocarbonate compound of formula (I) may be provided with the anionic polymerization initiator at room temperature (ca. 20-25° C.) as a mixture. The remaining part of elemental sulfur or the cyclic monothiocarbonate compound of formula (I) may be added at the copolymerization temperature. At the copolymerization temperature elemental sulfur is preferably added in molten form and dropwise or in small portions.

When elemental sulfur is partially provided at room temperature, the mixture of a first step a) preferably comprises up to 30 wt % of elemental sulfur, more preferably up to 10 wt %, based on the total weight of elemental sulfur.

When the cyclic monothiocarbonate compound of formula (I) is partially provided at room temperature, the mixture of a first step a) preferably comprises up to 20 wt % of the cyclic monothiocarbonate compound of formula (I), more preferably up to 5 wt %, based on the total weight of the cyclic monothiocarbonate compound of formula (I).

The anionic polymerization initiator may be provided at room temperature or may be added at the copolymerization temperature before or simultaneously with the cyclic monothiocarbonate compound of formula (I).

If desired, an organic thiol compound is generally added within the process at room temperature or at the copolymerization temperature, before or simultaneously with the cyclic monothiocarbonate compound of formula (I).

The cyclic monothiocarbonate compound of formula (I) is usually added such that the homopolymerization of the resulting alkylene sulfide is efficiently repressed. The addition is usually done slowly, for example, dropwise or in small portions, in order to have only a small concentration thereof in the reaction mixture. The rate of addition should be suitably adjusted in order to control the resulting foam formation.

The cyclic monothiocarbonate compound of formula (I) may be added as a solution in a solvent or preferably without a solvent, if the cyclic monothiocarbonate compound is liquid.

The product comprising the sulfur copolymer or the composition of one or more sulfur copolymers may be separated from the resulting reaction mixture in various ways. After cooling to room temperature, the product is usually separated from the reaction mixture to obtain the copolymer or the composition comprising one or more copolymers to be further processed in various applications. Such separation steps are typically done by conventional methods.

Dependent on the molecular weight of the obtained sulfur copolymer(s) and their solubility in an organic solvent, the product may be separated from the reaction mixture by homogenizing and/or filtering. Homogenizing may be preferably carried out with a suitable organic solvent, like a halogen-containing solvent, N-methylpyrrolidone (NMP), tetrahydrofuran (THF), toluene or carbon disulfide.

For example, the reaction mixture may be filtered, optionally after homogenizing. The product may be separated from the filtrate, for example, by evaporation of the solvent(s), and/or from the separated solid by washing with a suitable solvent and/or water and drying under reduced pressure. The product may be further purified by usual means.

Suitable examples of processes for effecting the copolymerization include the following process modifications A) to H):

A) A method which comprises
  a) providing the anionic polymerization initiator and optionally a solvent and/or an organic thiol compound;
  b) heating the resultant of step a) to the desired copolymerization temperature;
  c) adding the cyclic monothiocarbonate compound of formula (I) and elemental sulfur simultaneously or alternately, while copolymerizing the cyclic monothiocarbonate compound of formula (I) and sulfur to form a reaction mixture comprising the copolymer; and
  d) optionally separating the copolymer from the reaction mixture.

B) A method which comprises
  a) providing the anionic polymerization initiator, elemental sulfur and optionally a solvent and/or an organic thiol compound;
  b) heating the resultant of step a) to the desired copolymerization temperature;
  c) adding the cyclic monothiocarbonate compound of formula (I), while copolymerizing the cyclic monothiocarbonate compound of formula (I) and sulfur to form a reaction mixture comprising the copolymer; and
  d) optionally separating the copolymer from the reaction mixture.

C) A method which comprises
  a) providing the anionic polymerization initiator, elemental sulfur and optionally a solvent and/or an organic thiol compound;
  b) heating the resultant of step a) to the desired copolymerization temperature;
  c) adding the cyclic monothiocarbonate compound of formula (I) and optionally further elemental sulfur simultaneously or alternately, while copolymerizing the cyclic monothiocarbonate compound of formula (I) and sulfur to form a reaction mixture comprising the copolymer; and
  d) optionally separating the copolymer from the reaction mixture.

D) A method which comprises
  a) providing the anionic polymerization initiator, a part of the cyclic monothiocarbonate compound of formula (I) and optionally a solvent and/or an organic thiol compound;
  b) heating the resultant of step a) to the desired copolymerization temperature;
  c) adding the remaining part of the cyclic monothiocarbonate compound of formula (I) and elemental sulfur simultaneously or alternately, while copolymerizing the cyclic monothiocarbonate compound of formula (I) and sulfur to form a reaction mixture comprising the copolymer; and
  d) optionally separating the copolymer from the reaction mixture.

E) A method which comprises
  a) providing the anionic polymerization initiator and elemental sulfur and optionally an organic thiol compound;
  b) heating the resultant of step a) to the copolymerization temperature of at least 120° C.;
  c) adding the cyclic monothiocarbonate compound of formula (I), while copolymerizing the cyclic monothiocarbonate compound of formula (I) and sulfur to form a reaction mixture comprising the copolymer; and
  d) optionally separating the copolymer from the reaction mixture.

F) A method which comprises
  a) providing elemental sulfur and optionally a solvent and/or an organic thiol compound;
  b) heating the resultant of step a) to the desired copolymerization temperature;
  c) adding the cyclic monothiocarbonate compound of formula (I) and the anionic polymerization initiator, preferably simultaneously, while copolymerizing the cyclic monothiocarbonate compound of formula (I) and sulfur to form a reaction mixture comprising the copolymer; and
  d) optionally separating the copolymer from the reaction mixture.

G) A method which comprises
  a) providing the anionic polymerization initiator and elemental sulfur and optionally a solvent;
  b) heating the resultant of step a) to the desired copolymerization temperature;
  c) adding the cyclic monothiocarbonate compound of formula (I) and optionally the organic thiol compound, preferably simultaneously, while copolymerizing the cyclic monothiocarbonate compound of formula (I) and sulfur to form a reaction mixture comprising the copolymer; and d) optionally separating the copolymer from the reaction mixture.

H) A method which comprises a) providing the solvent;

b) heating the solvent to the copolymerization temperature of 40 to 180° C.;

c) adding the cyclic monothiocarbonate compound of formula (I), elemental sulfur, the anionic polymerization initiator and optionally the organic thiol compound, preferably simultaneously, while copolymerizing the cyclic monothiocarbonate compound of formula (I) and sulfur to form a reaction mixture comprising the copolymer; and d) optionally separating the copolymer from the reaction mixture.

Preferred suitable examples of processes for effecting the copolymerization are process modifications A, B), C) and E).

Preferably, the process is conducted without a solvent, usually under inert atmosphere, for example, under nitrogen or argon atmosphere. Sulfur may be used in its molten form at elevated temperatures, thus ≥120° C., and directly used as the reaction medium.

The sulfur copolymer may be prepared by copolymerizing of molten sulfur with at least one cyclic monothiocarbonate compound of formula (I). The temperature generally used in the process without a solvent is in a range of from about 120° C. to about 230° C. The reaction time of the copolymerizing step may vary in the range of from 0.5 to 8 hours, preferably from 1 to 6 hours.

Accordingly, in a preferred aspect, the invention relates to a process for preparing a sulfur copolymer, wherein the step of copolymerizing is conducted without a solvent, preferably at a temperature in the range of from 120 to 230° C.

More preferred is a process for preparing a sulfur copolymer, wherein the process comprises the steps:

a) providing the anionic polymerization initiator and elemental sulfur;

b) heating the resulting mixture of step a) to a temperature of from 120 to 230° C.;

c) adding the cyclic monothiocarbonate compound of formula (I) and optionally further elemental sulfur, while copolymerizing the cyclic monothiocarbonate compound of formula (I) and sulfur to form a reaction mixture comprising the copolymer; and d) optionally separating the copolymer from the reaction mixture.

Step d) is preferably done by homogenizing and filtering.

The addition of the cyclic monothiocarbonate compound of formula (I) and the optional further elemental sulfur may be done simultaneously or alternately.

Preferably, the process of step a) is conducted at a temperature of from 120 to 230° C., more preferably at a temperature of from 170 to 230° C., especially at a temperature range of from 170 to 190° C., 190 to 210° C. or 210 to 230° C.

Preferably, the step of copolymerizing is performed at a temperature range of from 120 to 150°, 150 to 170° C., 170 to 190° C., 190 to 210° C. or 210 to 230° C.

More preferably, the step of copolymerizing is performed at a temperature range of from 170 to 190° C., 190 to 210° C. or 210 to 230° C.

The reaction time of the copolymerizing step may be usually in the range of from 0.5 to 8 hours, preferably from 1 to 6 hours.

More preferably, the invention relates to a process for preparing a sulfur copolymer, wherein the process comprises the steps:

a) providing the anionic polymerization initiator and elemental sulfur;

b) heating the resultant of step a) to a temperature range of from 170 to 230° C.;

c) adding the cyclic monothiocarbonate compound of formula (I) and optionally further elemental sulfur to the mixture obtained in step a), while copolymerizing the cyclic monothiocarbonate compound of formula (I) and sulfur for 0.5 to 8 hours to form a reaction mixture comprising the copolymer; and d) optionally separating the copolymer from the reaction mixture.

The ratio of the monomers used in the instant process is generally selected in order to provide the desired properties of the sulfur copolymer.

Elemental sulfur and the cyclic monothiocarbonate compound of formula (I) may be used in various molar ratios. For example, the molar ratio of the cyclic monothiocarbonate compound of formula (I) to elemental sulfur is of from 99:1 to 1:99, preferably 80:20 to 20:80.

Thus, in a preferred aspect, the invention relates to a process for preparing a sulfur copolymer, wherein the step of copolymerizing a cyclic monothiocarbonate compound of formula (I) and elemental sulfur is conducted at a molar ratio range of from 99:1 to 1:99.

In a further aspect, the invention relates to a sulfur copolymer, obtainable by a process, as defined in any aspect herein.

Thus, the invention relates to a sulfur copolymer, obtainable by a process, the process comprising a step of copolymerizing a cyclic monothiocarbonate compound of formula

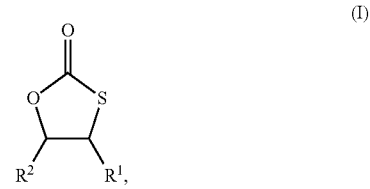

(I)

wherein $R^1$ and $R^2$ are independently of one another hydrogen, $C_1$-$C_{18}$-alkyl, $C_1$-$C_{18}$-alkyl substituted with halogen or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio or halogen;

with elemental sulfur in the presence of a polymerization initiator.

As the process usually provides a mixture of one or more sulfur copolymers, the invention further relates to a composition comprising one or more sulfur copolymers, obtainable by a process, the process comprising a step of copolymerizing a cyclic monothiocarbonate compound of formula

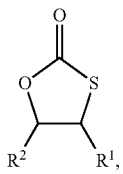
(I)

wherein $R^1$ and $R^2$ are independently of one another hydrogen, $C_1$-$C_{18}$-alkyl, $C_1$-$C_{18}$-alkyl substituted with halogen or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio or halogen; with elemental sulfur in the presence of a polymerization initiator.

A polysulfide unit, derived from elemental sulfur, may be incorporated adjacent to the sulfur atom of the alkylene sulfide unit of formula

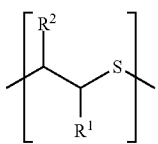
(VIa)

or

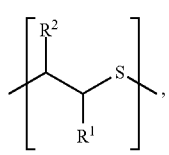
(VIb)

derived from the cyclic monothiocarbonate compound of formula (I), and/or adjacent to the β-carbon atom of the alkylene sulfide unit of formula (VIa) or (VIb).

Thus, the sulfur copolymer may be described as having alkylene units of formula

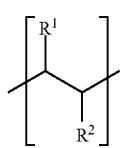
(IV)

and polysulfide $(S)_x$ units, wherein x may be about 1 to 10, preferably 1 to 8, and wherein the copolymer comprises at least one S—S-bond.

Accordingly, in a preferred aspect, the invention relates to a sulfur copolymer, said copolymer has at least 2 alkylene units of formula

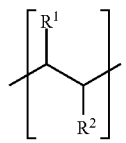
(IV)

and at least one polysulfide $S_x$ unit, wherein x is 1 to 10, preferably 1 to 8, and the copolymer comprises at least one S—S-bond.

More preferably, the instant process provides a sulfur copolymer, said copolymer comprises n alkylene units of formula (IV) and (n+1) polysulfide units, wherein the polysulfide units in total comprise (2n+1) to (2n+9) sulfur atoms, wherein n≥1, especially (2n+1) to (2n+8) sulfur atoms, in particular (2n+1) to (2n+7) sulfur atoms.

Accordingly, in a more preferred aspect, the invention relates to a sulfur copolymer, obtainable by the instant process, said copolymer comprises n alkylene units of formula

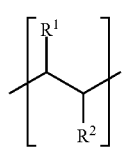
(IV)

and (n+1) polysulfide units, wherein the polysulfide units in total comprise (2n+1) to (2n+9) sulfur atoms, n≥1, and $R^1$ and $R^2$ are independently of one another hydrogen, $C_1$-$C_{18}$-alkyl, $C_1$-$C_{18}$-alkyl substituted with halogen or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio, or halogen.

Especially, the polysulfide units in total comprise (2n+1) to (2n+8) sulfur atoms, in particular (2n+1) to (2n+7) sulfur atoms.

In a further aspect, the invention relates to a sulfur copolymer, said copolymer comprises n alkylene units of formula (IV)

and (n+1) polysulfide units, wherein the polysulfide units in total comprise (2n+1) to (2n+9) sulfur atoms, especially (2n+1) to (2n+8) sulfur atoms, in particular (2n+1) to (2n+7) sulfur atoms, n≥1, and $R^1$ and $R^2$ are independently of one another hydrogen, $C_1$-$C_{18}$-alkyl, $C_1$-$C_{18}$-alkyl substituted with halogen or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio, or halogen.

In a further aspect, the invention relates to a composition comprising one or more sulfur copolymers, said copolymer(s) comprise(s) n alkylene units of formula

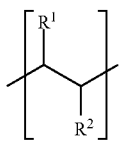
(II)

and (n+1) polysulfide units, wherein the polysulfide units in total comprise (2n+1) to (2n+9) sulfur atoms, especially (2n+1) to (2n+8) sulfur atoms, in particular (2n+1) to (2n+7) sulfur atoms, n≥1, and $R^1$ and $R^2$ are independently of one another hydrogen, $C_1$-$C_{18}$-alkyl, $C_1$-$C_{18}$-alkyl substituted with halogen or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio, or halogen.

The instant composition may additionally comprise a reaction product, wherein only one polysulfide unit is incorporated between two terminal groups resulting from the cyclic monothiocarbonate compound of formula (I).

Accordingly, the composition comprising one or more sulfur copolymers is preferred, wherein the composition comprises one or more polysulfide compound(s) of formula

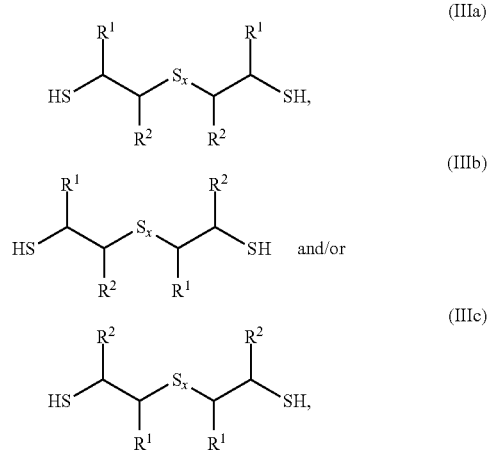

wherein x is 2 to 8 and denotes the total of the sulfur atoms present in formulae (IIIa), (IIIb) and (IIIc).

Typically, the sulfur copolymer may have an average molecular weight up to 20,000 g/mol, preferably up to 10,000, more preferably up to 5,000. The term "molecular weight", as used herein, means the number average molecular weight $M_n$, as usually determined by gel-permeation chromatography (GPC) against polystyrene as standard.

The sulfur copolymers or the polymer composition comprising one or more sulfur copolymers may be processed into a desired form by conventional methods, which is suitable for the respective application. For example, the sulfur copolymer may be used in an optical application, a sealant application, in sulfur immobilization in polymer matrices, in a metal working fluid and/or as an active material in Li—S batteries.

Thus, in a further aspect, the invention relates to an article formed with a sulfur copolymer, as defined in any aspect herein, or with a polymer composition comprising one or more sulfur copolymers, as defined in any aspect herein.

Further, the invention relates to the use of a sulfur copolymer, as defined in any aspect herein, or a polymer composition comprising one or more sulfur copolymers, as defined in any aspect herein, in an optical application, a sealant application, in sulfur immobilization in polymer matrices, in a metal working fluid and/or as an active material in Li—S batteries.

The attractive chemically accessibility and performance properties of a cyclic monothiocarbonate compound are used with elemental sulfur to prepare a new chemical platform for sulfur-based polymeric materials.

The instant process allows an easily available synthetic route to organic sulfur copolymers which enables an industrially viable production and/or is economic and flexible.

Further, the instant process allows the preparation of a sulfur copolymer using a S-containing monomer which has improved storage stability, compared to ethylene sulfide or propylene sulfide.

The instant process enables an easy access for copolymers having a desirable sulfur content, which may be adjusted to be suitable for use in various applications. For example, the process may be adjusted to obtain sulfur copolymers, which are suitable for forming sealants.

Especially the instant process provides an easy access for copolymers having, for example, a high sulfur content, suitable for use in sulfur immobilization in polymer matrices, as a metal working fluid and/or as an active material in Li—S batteries.

For example, the sulfur copolymer having a high content of sulfur and/or high viscosity may be suitably used as a metal working fluid.

When the sulfur copolymer is to be used in an optical element, it may be desirable to use relatively less sulfur in the process, in order to provide optical clarity. Thus, the instant sulfur copolymers exhibit a high refractive index, for example, of about 1.65 to 2.1, at visible and infrared wavelengths and may therefore be suitable in forming optical elements such as lenses, prisms and waveguides.

The definitions and preferences given for the process mentioned herein-before apply in any combination as well as in any combination for the other aspects of the invention.

The present invention will now be explained in more detail with reference to the following examples. These examples should not be construed as limited. Unless otherwise stated, "%" is always % by weight (wt %).

EXAMPLE

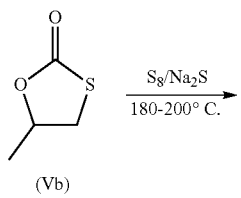

(Vb)

$S_8$ (25.6 g, 0.1 mol) and $Na_2S$ (0.78 g, 0.01 mol) were added to a flask and heated to 180-190° C. under nitrogen atmosphere, where a viscous fluid was formed under stirring. Me-CTC of formula (Vb) (23.6 g, 0.2 mol) was added dropwise within 30 min, while a reddish-brown mixture was formed under evolution of gas. The mixture was stirred for 2 hours at 200° C., while a black, viscous mixture was formed. After cooling, a fraction of the mixture was dissolved in chloroform, the solid residue was removed by filtration, and the solvent was removed under reduced pressure. A dark viscous liquid product was obtained.

The product was identified by HRMS-HPLC coupling as a composition comprising propylene sulfide-sulfur copolymers of following formulae.

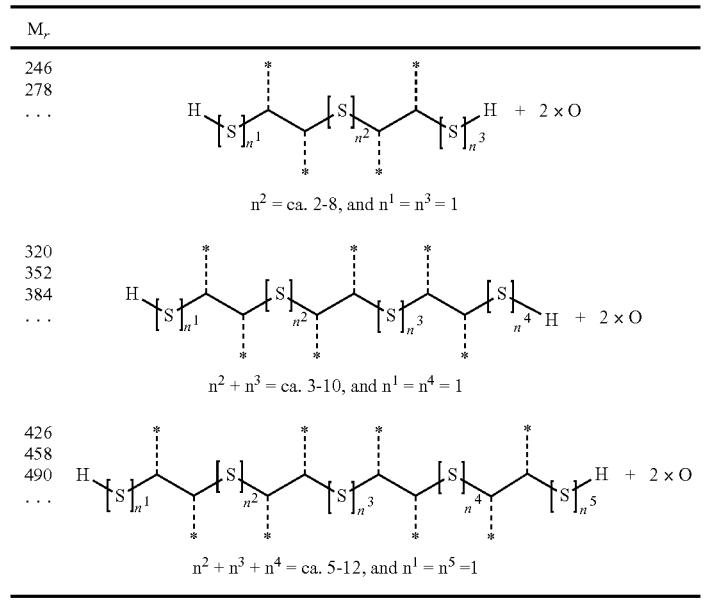

| $M_r$ | |
|---|---|
| 246 278 ... | $n^2$ = ca. 2-8, and $n^1 = n^3 = 1$ |
| 320 352 384 ... | $n^2 + n^3$ = ca. 3-10, and $n^1 = n^4 = 1$ |
| 426 458 490 ... | $n^2 + n^3 + n^4$ = ca. 5-12, and $n^1 = n^5 = 1$ |

$M_r$=monoisotopic relative molecular mass (dimensionless)

The empirical formula was confirmed by accurate mass analysis.

2* within one ethylene unit denote one H and one Me

Due to HPLC analysis longer sulfur copolymers could not be obtained since they did not pass the column unharmed. Each of the copolymers as identified by HRMS include 2 oxygen atoms, wherein it is assumed that the presence of oxygen is an artefact, resulting from the analytical procedure.

HPLC-MS: Thermo Scientific Q Exactive Plus Orbitrap LC-MS/MS System (Column XSelect CSH C18, 150×3.0 mm, 3.5 μm; 1.0 ml/min, 40° C.; eluent THF)

Elemental analysis (Analyzer Vario Micro Cube/ELEMENTAR)

S: 77 g/100 g

The molar ratio of C:H:S was found by elemental analysis: 3:6:5.1

The invention claimed is:

1. A process for preparing a sulfur copolymer, the process comprising:
   copolymerizing a cyclic monothiocarbonate compound of formula

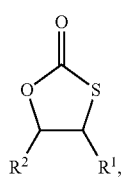

(I)

wherein $R^1$ and $R^2$ are independently of one another hydrogen, $C_1$-$C_{18}$-alkyl, $C_1$-$C_{18}$-alkyl substituted with halogen or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio, or halogen;
with elemental sulfur in the presence of a polymerization initiator.

2. The process according to claim 1, wherein
$R^1$ and $R^2$ are independently of one another and hydrogen, $C_1$-$C_4$-alkyl, $C_1$-$C_{18}$-alkyl substituted with halogen or interrupted with O or S; $C_6$-$C_{12}$-aryl or $C_6$-$C_{12}$-aryl substituted with $C_1$-$C_4$-alkyl, $C_1$-$C_4$-alkoxy, $C_1$-$C_4$-alkylthio or halogen.

3. The process according to claim 1, wherein
$R^1$ is hydrogen, and
$R^2$ is hydrogen, $C_1$-$C_4$-alkyl, $C_1$-$C_8$-alkyl substituted with halogen or interrupted with O or S, or phenyl.

4. The process according to claim 1, wherein
$R^1$ is hydrogen, and
$R^2$ is hydrogen or $C_1$-$C_4$-alkyl.

5. The process according to claim 1, wherein the polymerization initiator is an anionic polymerization initiator selected from the group consisting of an amine-containing base, an organic phosphine compound, a metal salt of a mercapto compound, a metal alcoholate, and a basic inorganic salt.

6. The process according to claim 5, wherein the anionic polymerization initiator is a basic inorganic salt.

7. The process according to claim 1, wherein the copolymerizing is conducted at a temperature in the range of from 40 to 230° C.

8. The process according to claim 1, wherein the copolymerizing is conducted without a solvent.

9. The process according to claim 1, wherein the process comprises:
   a) providing the anionic polymerization initiator and the elemental sulfur;
   b) heating the resulting mixture of a) to a temperature of from 120 to 230° C.;
   c) adding the cyclic monothiocarbonate compound of formula (I) and optionally further elemental sulfur, while copolymerizing the cyclic monothiocarbonate compound of formula (I) and sulfur to form a reaction mixture comprising the copolymer; and d) optionally, separating the copolymer from the reaction mixture.

10. The process according to claim 1, wherein the copolymerizing the cyclic monothiocarbonate compound of formula (I) and the elemental sulfur is conducted at a molar ratio range of from 99:1 to 1:99.

11. A sulfur copolymer, obtained by the process as defined in claim 1.

12. The sulfur copolymer according to claim 11, wherein said copolymer comprises n alkylene units of formula

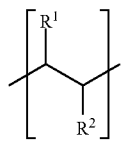

(II)

and (n+1) polysulfide units, wherein the polysulfide units in total comprise (2n+1) to (2n+9) sulfur atoms, $n \geq 1$, and $R^1$ and $R^2$ are independently of one another hydrogen $C_1$-$C_{18}$-alkyl, $C_1$-$C_{18}$-alkyl substituted with halogen or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio, or halogen.

13. The sulfur copolymer according to claim 12, wherein the polysulfide units in total comprise (2n+1) to (2n+8) sulfur atoms, and $n \geq 1$.

14. A sulfur copolymer according to claim 11, comprising n alkylene units of formula

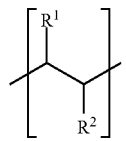

(II)

and (n+1) polysulfide units, wherein the polysulfide units in total comprise (2n+1) to (2n+9) sulfur atoms, $n \geq 1$, and $R^1$ is hydrogen, and $R^2$ is hydrogen, $C_1$-$C_4$-alkyl, $C_1$-$C_8$-alkyl substituted with halogen or interrupted with O or S, or phenyl.

15. The sulfur copolymer according to claim 14, wherein $R^1$ is hydrogen, and $R^2$ is hydrogen or $C_1$-$C_4$-alkyl.

16. The composition according to claim 15, wherein the composition comprises one or more polysulfide compound(s) of formula

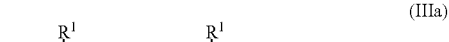

(IIIa)

(IIIb)

(IIIc)

wherein x is 2 to 8 and denotes a total of the sulfur atoms present in formulae (IIIa), (IIIb), and (IIIc), and $R^1$ and $R^2$ are independently of one another hydrogen, $C_1$-$C_{18}$-alkyl, $C_1$-$C_{18}$-alkyl substituted with halogen or interrupted with O or S; $C_6$-$C_{18}$-aryl or $C_6$-$C_{12}$-aryl substituted with $C_1$-$C_4$-alkyl, $C_1$-$C_4$-alkoxy, $C_1$-$C_4$-alkylthio, or halogen.

17. The process according to claim 8, wherein the copolymerizing is conducted at a temperature in the range of from 120 to 230° C.

18. The sulfur copolymer according to claim 13, wherein the polysulfide units in total comprise (2n+1) to (2n+7) sulfur atoms.

19. A composition, comprising one or more sulfur copolymers as defined in claim 11.

* * * * *